United States Patent
Andersen

(10) Patent No.: US 10,046,421 B2
(45) Date of Patent: Aug. 14, 2018

(54) WELDING APPARATUS

(71) Applicant: Andersen Industries, Inc., Adelanto, CA (US)

(72) Inventor: Steven L. Andersen, Hesperia, CA (US)

(73) Assignee: Andersen Industries, Inc., Adelanto, CA (US)

( * ) Notice: Subject to any disclaimer, the term of this patent is extended or adjusted under 35 U.S.C. 154(b) by 287 days.

(21) Appl. No.: 14/719,924

(22) Filed: May 22, 2015

(65) Prior Publication Data

US 2015/0360313 A1      Dec. 17, 2015

Related U.S. Application Data

(60) Provisional application No. 62/010,627, filed on Jun. 11, 2014.

(51) Int. Cl.
  *B23K 37/02*      (2006.01)
  *B23K 9/32*       (2006.01)

(52) U.S. Cl.
  CPC ............ *B23K 37/0282* (2013.01); *B23K 9/32* (2013.01); *B23K 37/0205* (2013.01)

(58) Field of Classification Search
  CPC ............ B23K 37/0282; B23K 37/0205; B23K 37/0241; B23K 37/0247; B23K 37/0258; B23K 9/00; B23K 9/1006; B23K 9/32; B23K 9/321
  USPC ...................................................... 219/130.1
  See application file for complete search history.

(56) References Cited

U.S. PATENT DOCUMENTS

| | | |
|---|---|---|
| 2,818,494 A | 12/1957 | Bernard et al. |
| 2,909,394 A | 10/1959 | Wuesthoff |
| 3,050,196 A | 8/1962 | Yates |
| 3,501,613 A | 3/1970 | Cornell, Jr. |
| 3,543,989 A | 12/1970 | Cooper |
| 3,692,974 A | 9/1972 | Thomason et al. |
| 3,926,104 A | 12/1975 | El Dorado |
| 4,082,092 A | 4/1978 | Foster |
| 4,160,151 A | 7/1979 | Tonita |

(Continued)

OTHER PUBLICATIONS

International Search Report and Written Opinion of International Application No. PCT/US2015/033644, dated Aug. 19, 2015, 8 pages.

(Continued)

*Primary Examiner* — Dana Ross
*Assistant Examiner* — Joe E Mills, Jr.
(74) *Attorney, Agent, or Firm* — Jeffrey G. Sheldon; Cislo & Thomas LLP

(57) ABSTRACT

A rotatable gas metal arc welding apparatus comprising: a) a rotatable base; b) a rotation brake; c) a primary welding boom arm; d) at least one secondary welding boom arm rotatably attached to the primary welding boom arm, the at least one secondary welding boom arm being rotatable about a swivel joint so as to be rotatable in a generally horizontal plane; e) a MIG welder station; f) at least one manually operated welding gun connector, each welding gun connector being suspended from a secondary welding boom arm; g) a process controller for controlling a welding gun and the rotation brake; h) a rotatable electrical input connection for connecting electrical power from an external electrical power source to the base; i) an electrical ground connection; and j) a welding wire supply station.

21 Claims, 17 Drawing Sheets

(56) References Cited

U.S. PATENT DOCUMENTS

| | | | |
|---|---|---|---|
| 4,221,953 A | 9/1980 | Kiilunen | |
| 4,532,407 A | 7/1985 | Williams et al. | |
| 4,539,465 A | 9/1985 | Bosna | |
| 4,629,860 A | 12/1986 | Lindbom | |
| 4,693,663 A * | 9/1987 | Brenholt | B25J 9/047 414/735 |
| 4,855,560 A | 8/1989 | Sonoda et al. | |
| 4,896,015 A | 1/1990 | Taboada et al. | |
| 5,013,887 A | 5/1991 | Gold | |
| 5,015,821 A | 5/1991 | Sartorio et al. | |
| 5,025,126 A | 6/1991 | Hansen | |
| 5,274,213 A | 12/1993 | Sartorio | |
| 5,512,726 A | 4/1996 | Arantes et al. | |
| 5,593,081 A | 1/1997 | Kiilunen | |
| 6,087,611 A | 7/2000 | De Bruyn et al. | |
| 6,274,839 B1 | 8/2001 | Stone et al. | |
| 6,297,472 B1 | 10/2001 | Bong et al. | |
| 6,335,510 B1 * | 1/2002 | Carbines | B23K 9/287 219/125.1 |
| 6,392,190 B1 | 5/2002 | Sue et al. | |
| 6,555,786 B2 | 4/2003 | Sasano | |
| 6,787,729 B2 | 9/2004 | Dugas et al. | |
| 6,948,720 B1 * | 9/2005 | Carlson | B23Q 16/025 269/63 |
| 7,291,807 B2 | 11/2007 | Kitamura et al. | |
| 7,429,716 B2 | 9/2008 | Bong et al. | |
| 8,003,916 B2 | 8/2011 | Ohara et al. | |
| 8,231,045 B2 | 7/2012 | Lagerkvist | |
| 8,552,330 B2 | 10/2013 | Mate | |
| 8,624,147 B2 * | 1/2014 | Sassatelli | B23K 9/291 219/76.14 |
| 2002/0005397 A1 * | 1/2002 | Bong | B23K 9/0203 219/125.1 |
| 2003/0150647 A1 * | 8/2003 | Mason | E21B 19/10 175/203 |
| 2004/0052630 A1 * | 3/2004 | Nihei | B25J 13/085 414/730 |
| 2005/0224480 A1 | 10/2005 | Lipnevicius | |
| 2008/0128400 A1 * | 6/2008 | Michels | B23K 11/318 219/148 |
| 2008/0149608 A1 * | 6/2008 | Albrecht | B23K 9/123 219/130.1 |
| 2010/0178135 A1 * | 7/2010 | Laceky | B25J 19/0029 414/217 |
| 2011/0045420 A1 | 2/2011 | Tanca | |
| 2011/0210110 A1 * | 9/2011 | Dearman | B23K 9/0206 219/137 R |
| 2011/0277775 A1 * | 11/2011 | Holop | A61B 17/3423 128/849 |
| 2012/0067851 A1 | 3/2012 | Lee | |
| 2013/0119040 A1 | 5/2013 | Suraba et al. | |
| 2013/0277344 A1 | 10/2013 | Guymon et al. | |
| 2014/0001160 A1 * | 1/2014 | Mate | B23K 9/324 219/73.1 |
| 2014/0332504 A1 * | 11/2014 | Hamada | B23K 31/00 219/121.41 |

OTHER PUBLICATIONS

KIPO, International Preliminary Report on Patentability issued in related International Patent Application No. PCT/US2015/033644 dated Dec. 15, 2016 (6 pages).

* cited by examiner

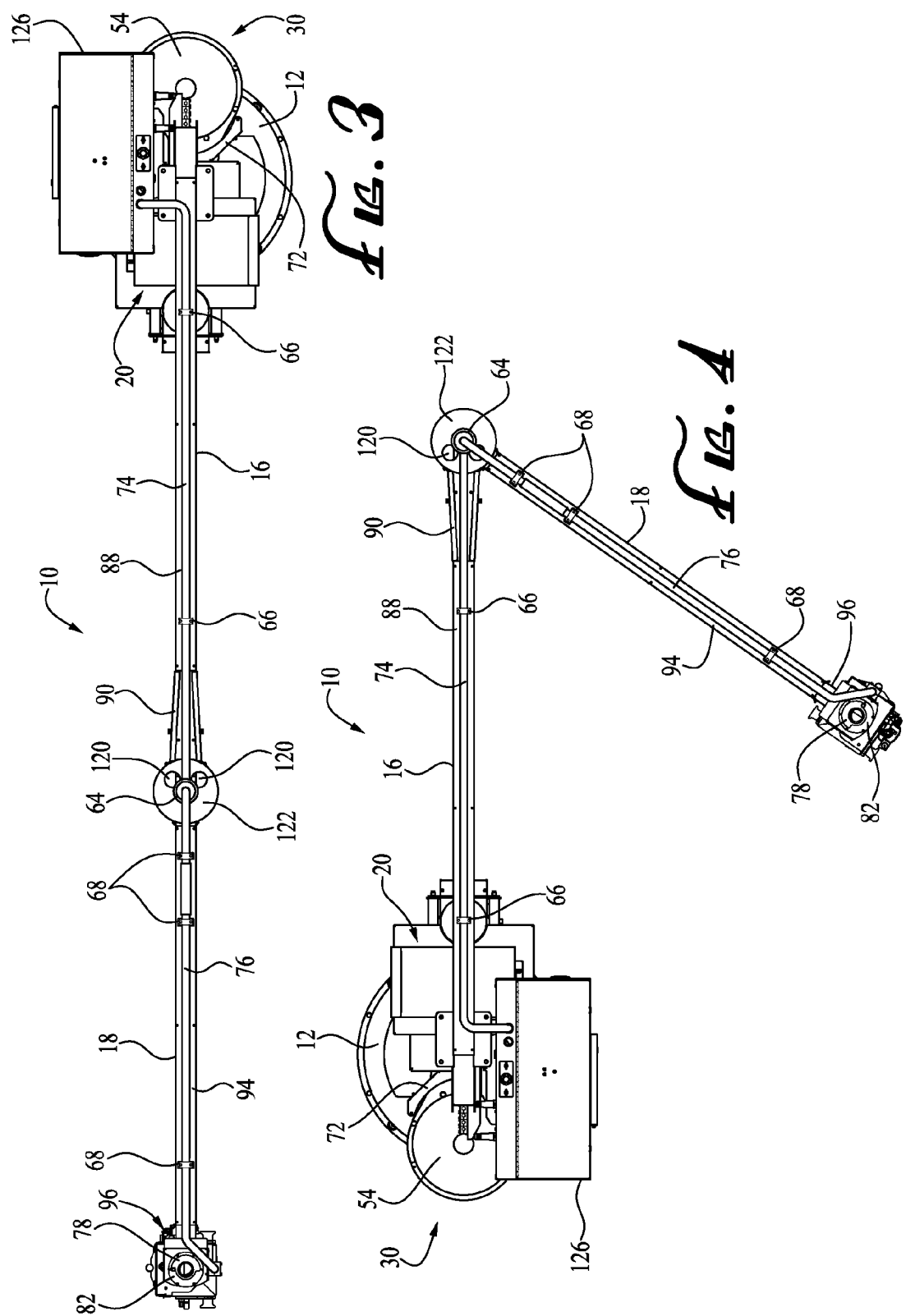

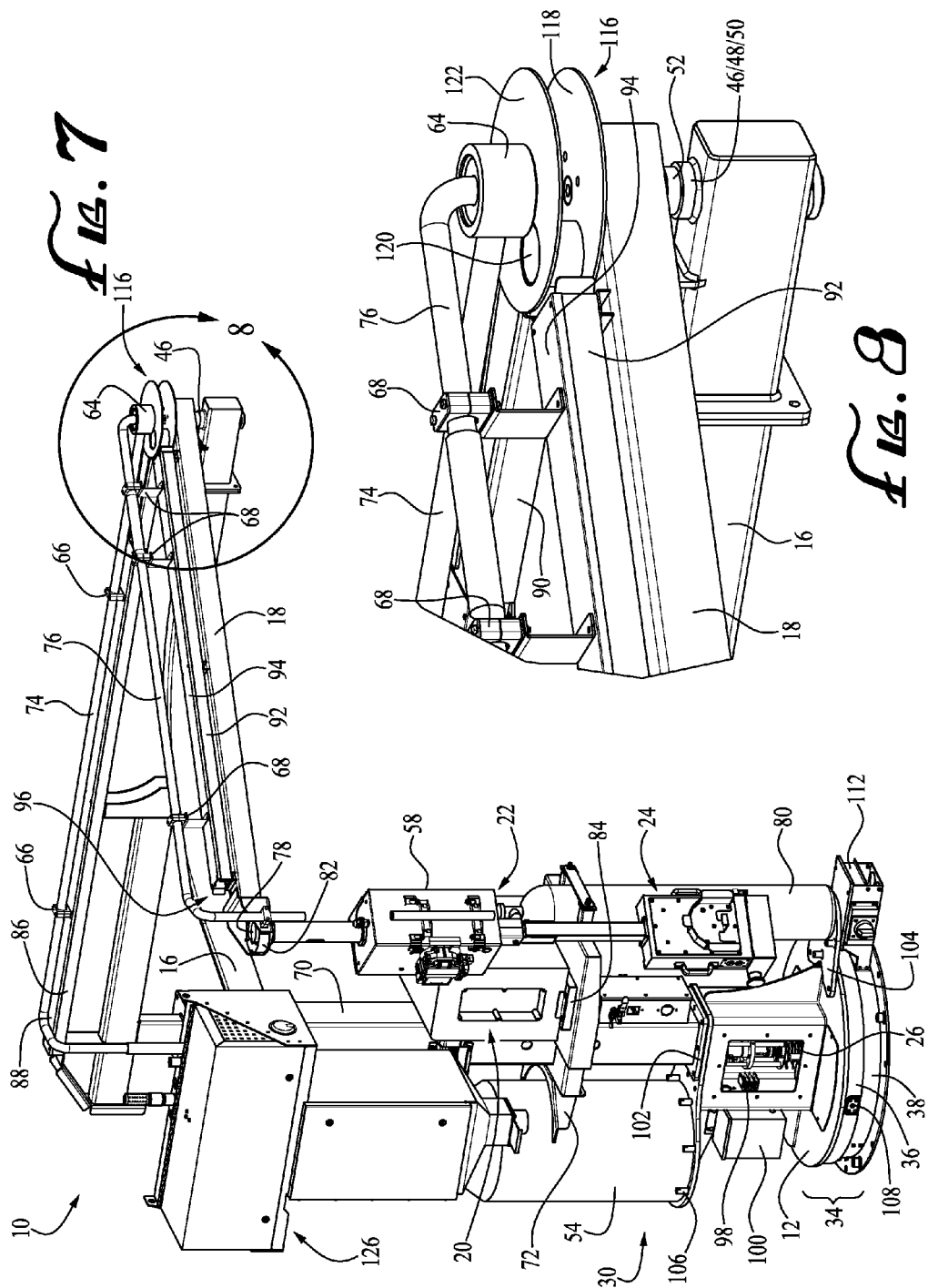

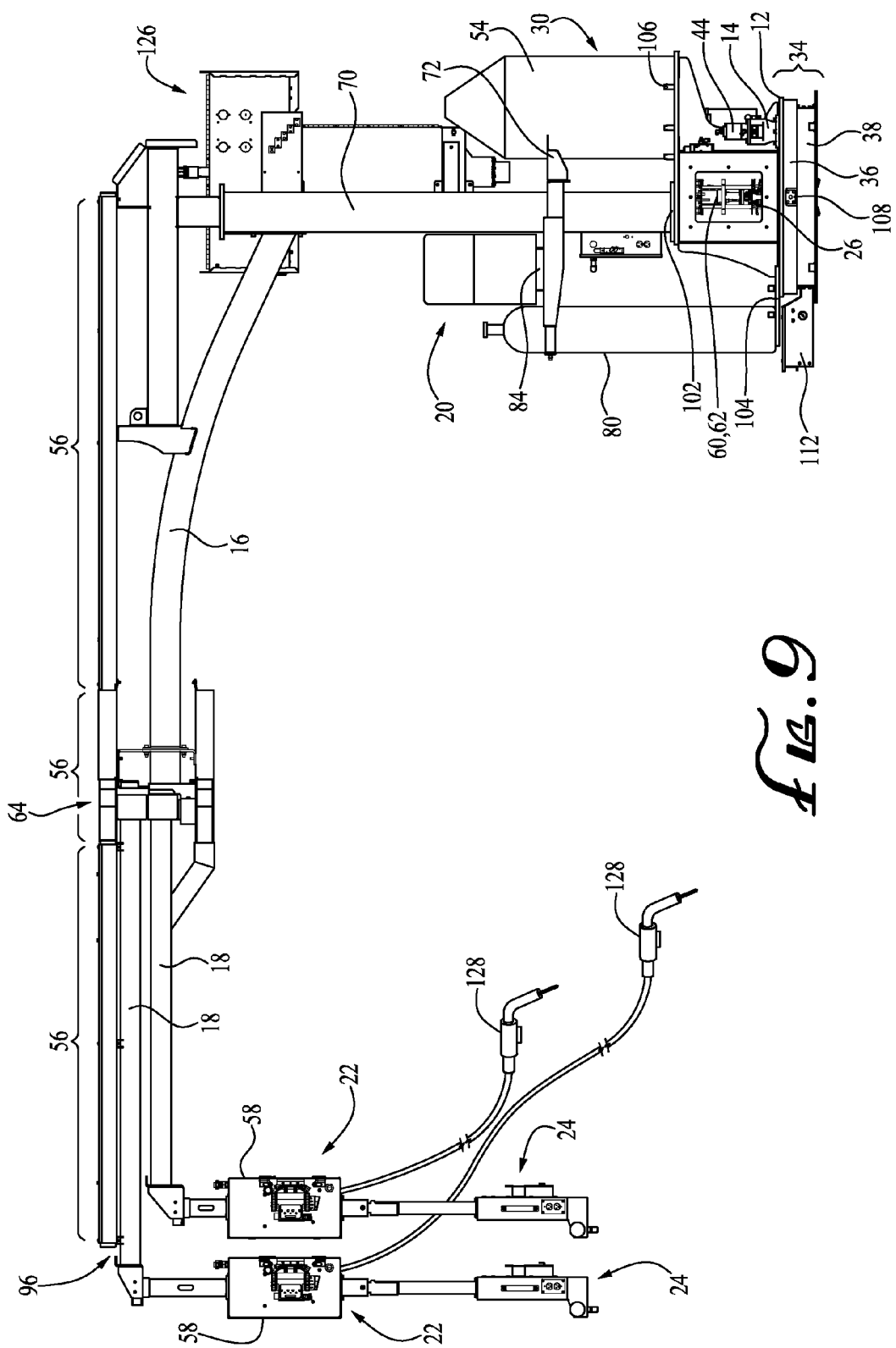

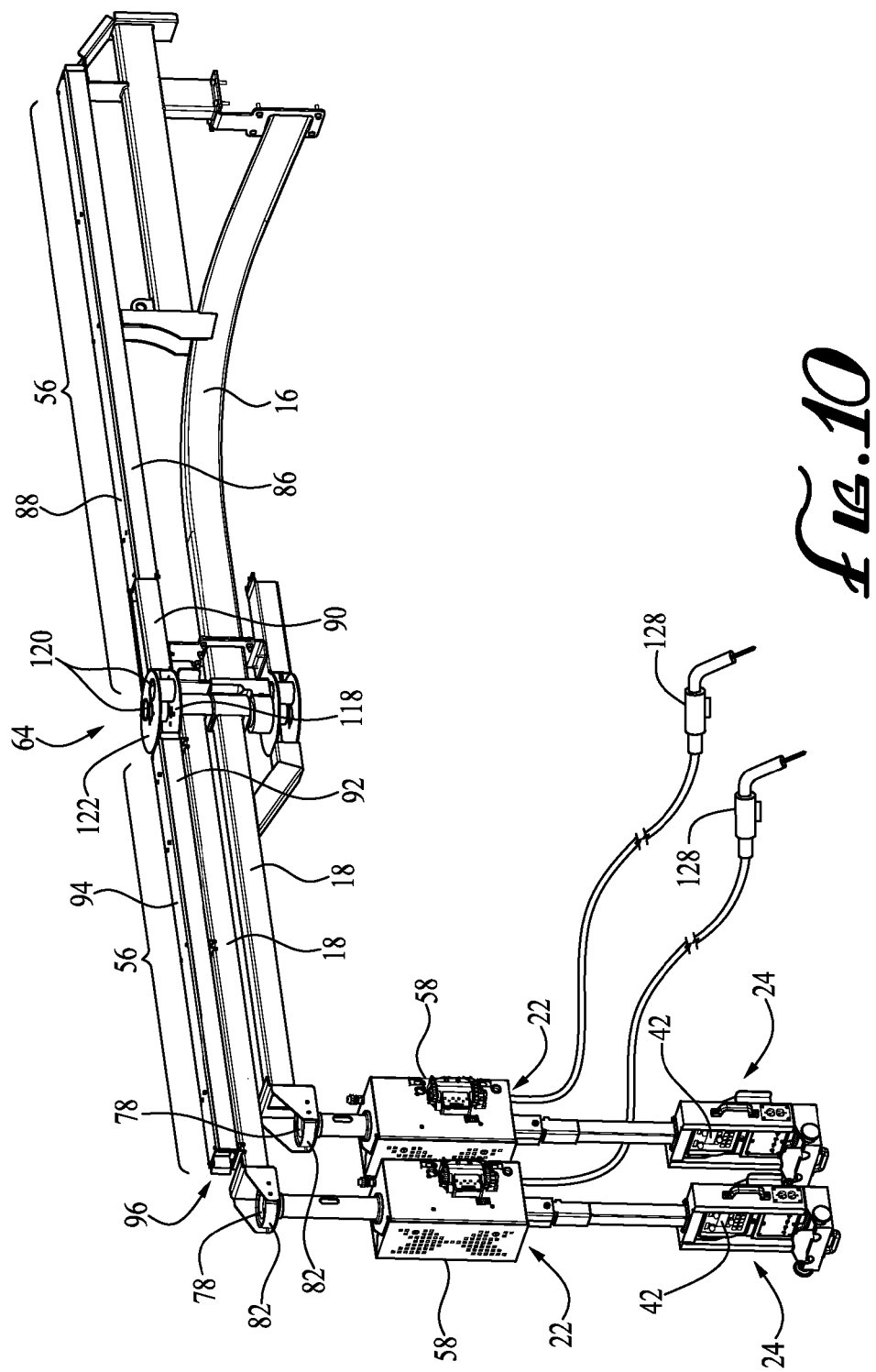

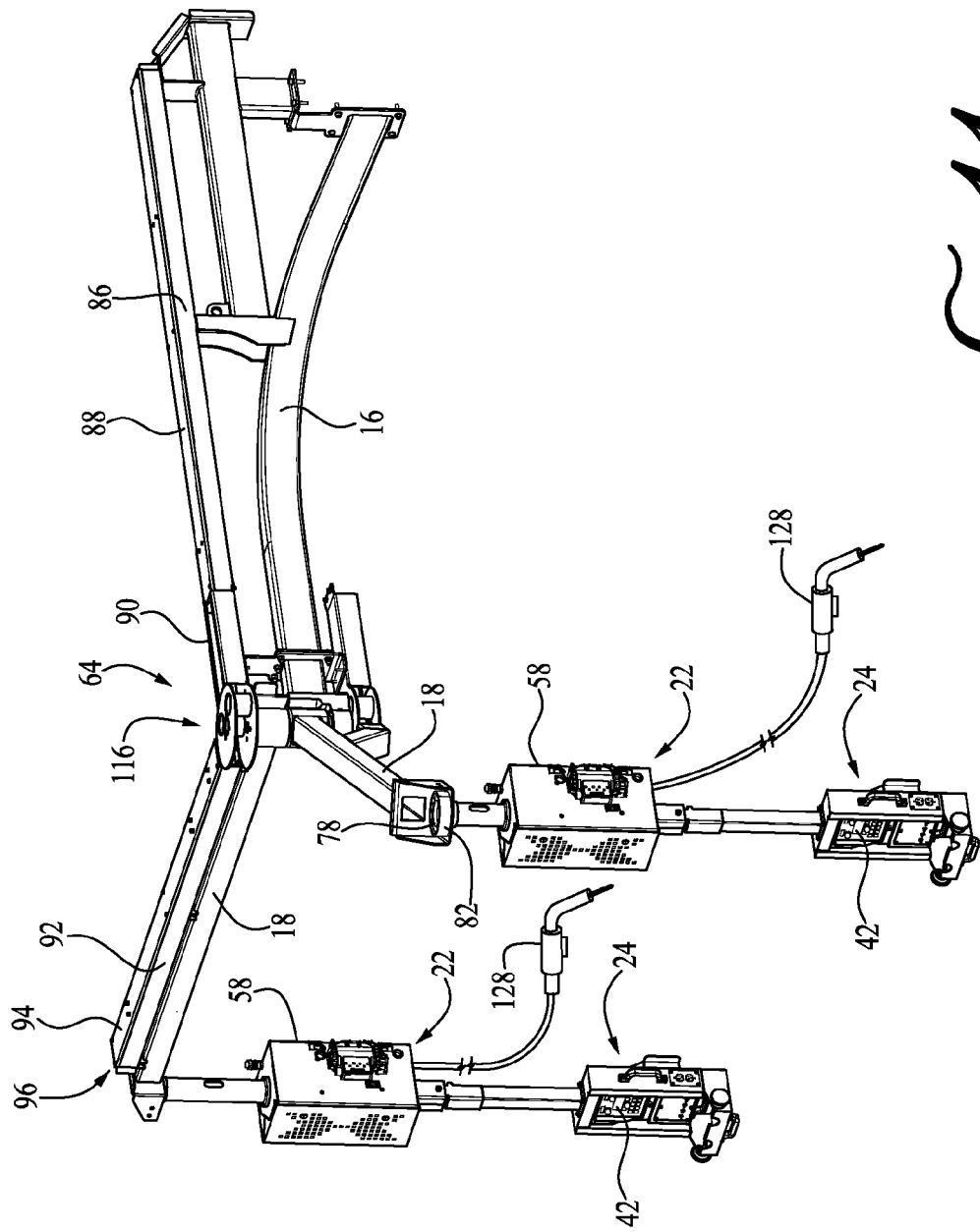

WELDING APPARATUS

RELATED APPLICATIONS

This application claims priority from U.S. patent application Ser. No. 62/010,627 entitled "Welding Apparatus," filed Jun. 11, 2014, the entirety of which is incorporated herein by reference.

BACKGROUND

Gas metal arc welding (GMAW), also referred to as metal inert gas welding (MIG), typically requires a facility having a myriad of specialty equipment, including welding equipment, compressed air, electrical power, consumable welding wire spools, wire feeding equipment, fume removal and dust extraction. All such specialty equipment needs to be readily available where welding work is to be carried out, and all required conduits, cables and hoses need to be protected and "out of the way."

These needs have posed a long standing problem in GMAW/MIG welding facilities. Stationary welding equipment traditionally requires considerable movement of work pieces to and from the welding apparatus. Portable welding equipment requires considerable movement of the welding equipment and associated compressed air conduits, electrical power lines, consumable welding wire spools, wire feeding equipment, and fume and dust extraction equipment. All such movement of work pieces or welding equipment is labor intensive, time consuming and potentially hazardous to equipment and personnel.

The invention is directed to a solution to the above-described problems. The invention is a welding apparatus having a rotating base and a double articulating welding boom. The rotating base incorporates a floor mounted bearing, which allows for rotating the entire boom and all welding related apparatus. The double articulating boom comprises a primary arm and a secondary arm.

SUMMARY OF THE INVENTION

The invention is a rotatable gas metal arc welding apparatus comprising: a) a rotatable base; b) a rotation brake for alternatively (i) allowing rotation of the base and (ii) halting the rotation of the base; c) a primary welding boom arm attached to the base; d) at least one secondary welding boom arm rotatably attached to the primary welding boom arm, the at least one secondary welding boom arm being rotatable about a swivel joint so as to be rotatable in a generally horizontal plane; e) a MIG welder station attached to the apparatus; f) at least one manually operated welding gun connector, each welding gun connector being suspended from a secondary welding boom arm; g) a process controller attached to the apparatus, for controlling a welding gun and the rotation brake; h) a rotatable electrical input connection for connecting electrical power from an external electrical power source to the base; i) an electrical ground connection, the ground connection being unhindered by the rotation of the base; and j) a welding wire supply station attached to the apparatus.

DRAWINGS

Features, aspects and advantages of the present invention will become better understood with reference to the following description, appended claims, and accompanying drawings where:

FIG. 3 is a top view of the welding apparatus illustrated in FIG. 1;

FIG. 4 is a second top view of the welding apparatus illustrated in FIG. 1, showing a secondary arm of the welding boom rotated with respect to a primary arm of the welding boom;

FIG. 7 is a second perspective view of the welding apparatus illustrated in FIG. 1, showing the secondary arm rotated with respect to the primary arm and showing details of component parts;

FIG. 8 is a detail view of the joint connecting the secondary arm to the primary arm in the welding apparatus illustrated in FIG. 7;

FIG. 9 is a side view of a second welding apparatus having features of the present invention, showing a first secondary arm and a second secondary arm of the welding boom;

FIG. 10 is a perspective view of a portion of the welding apparatus illustrated in FIG. 9;

FIG. 11 is a perspective view of the welding apparatus illustrated in FIG. 10, showing the first secondary arm and the second secondary arm rotated with respect to the primary arm;

DETAILED DESCRIPTION OF TILE INVENTION

Figure 1:
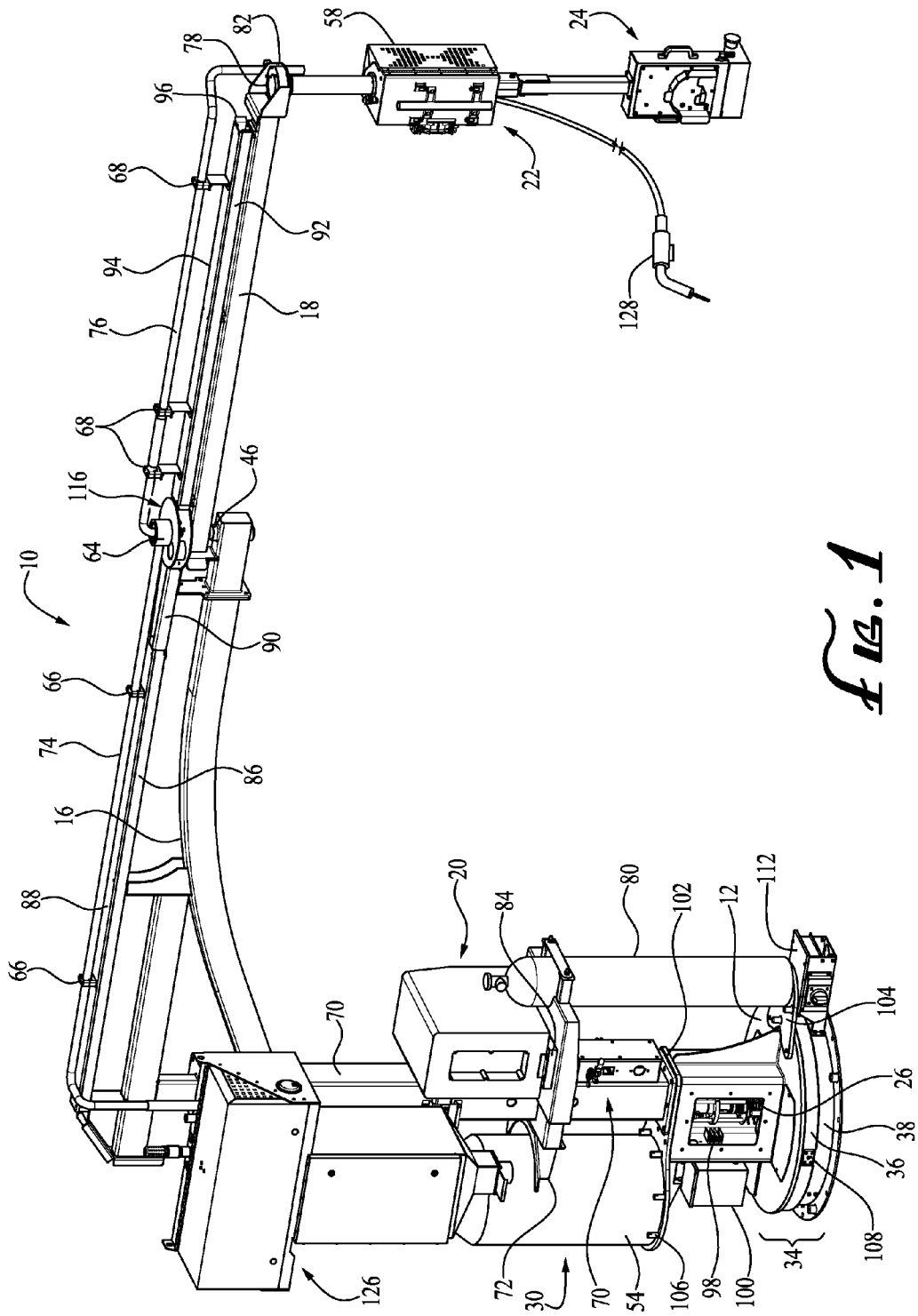
FIG. 1 is a perspective view of a first welding apparatus having features of the invention.
Figure 2:
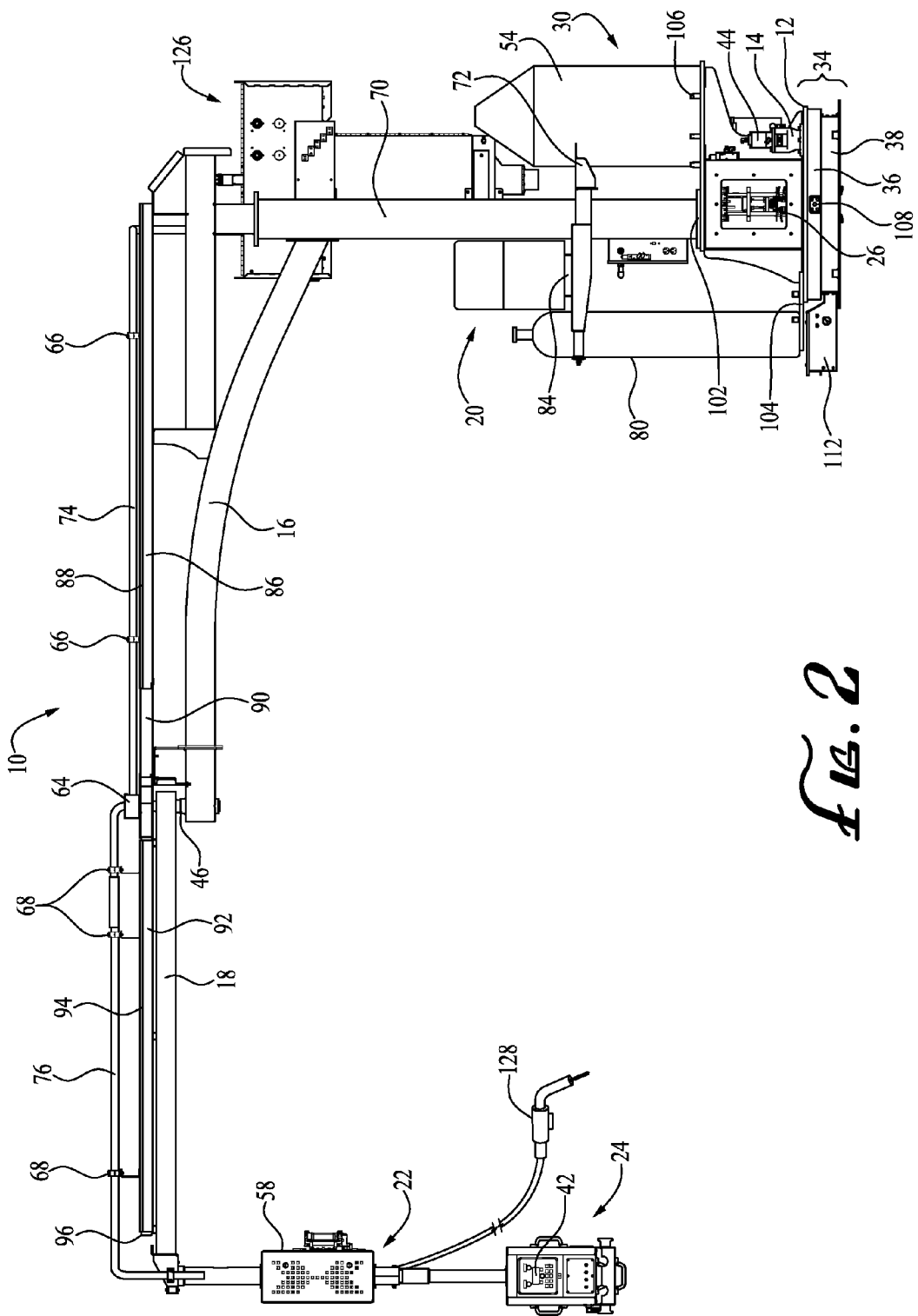
FIG. 2 is a side view of the welding apparatus illustrated in FIG. 1.
Figure 5:
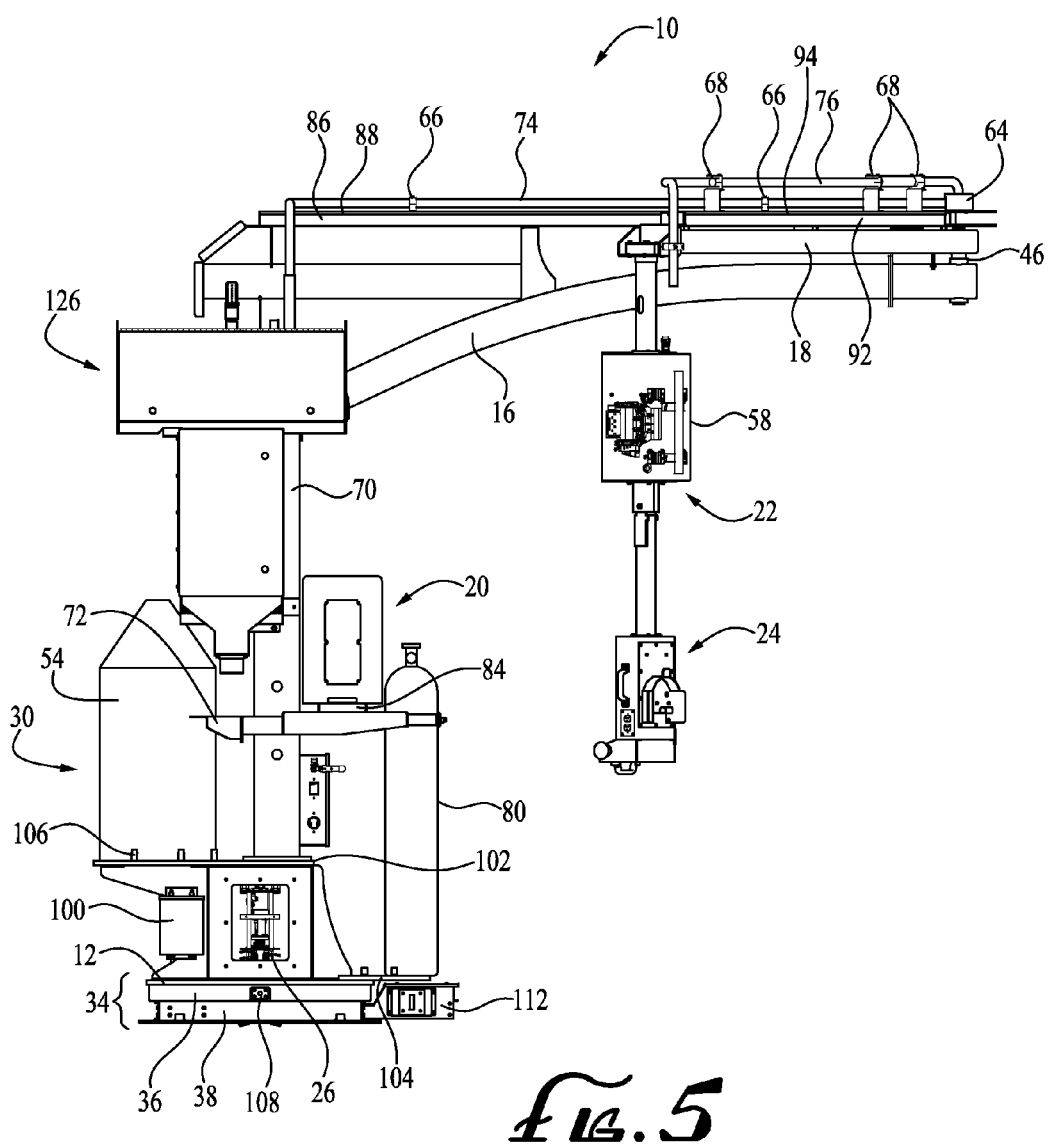
FIG. 5 is a side view of the welding apparatus illustrated in FIG. 4.
Figure 6:
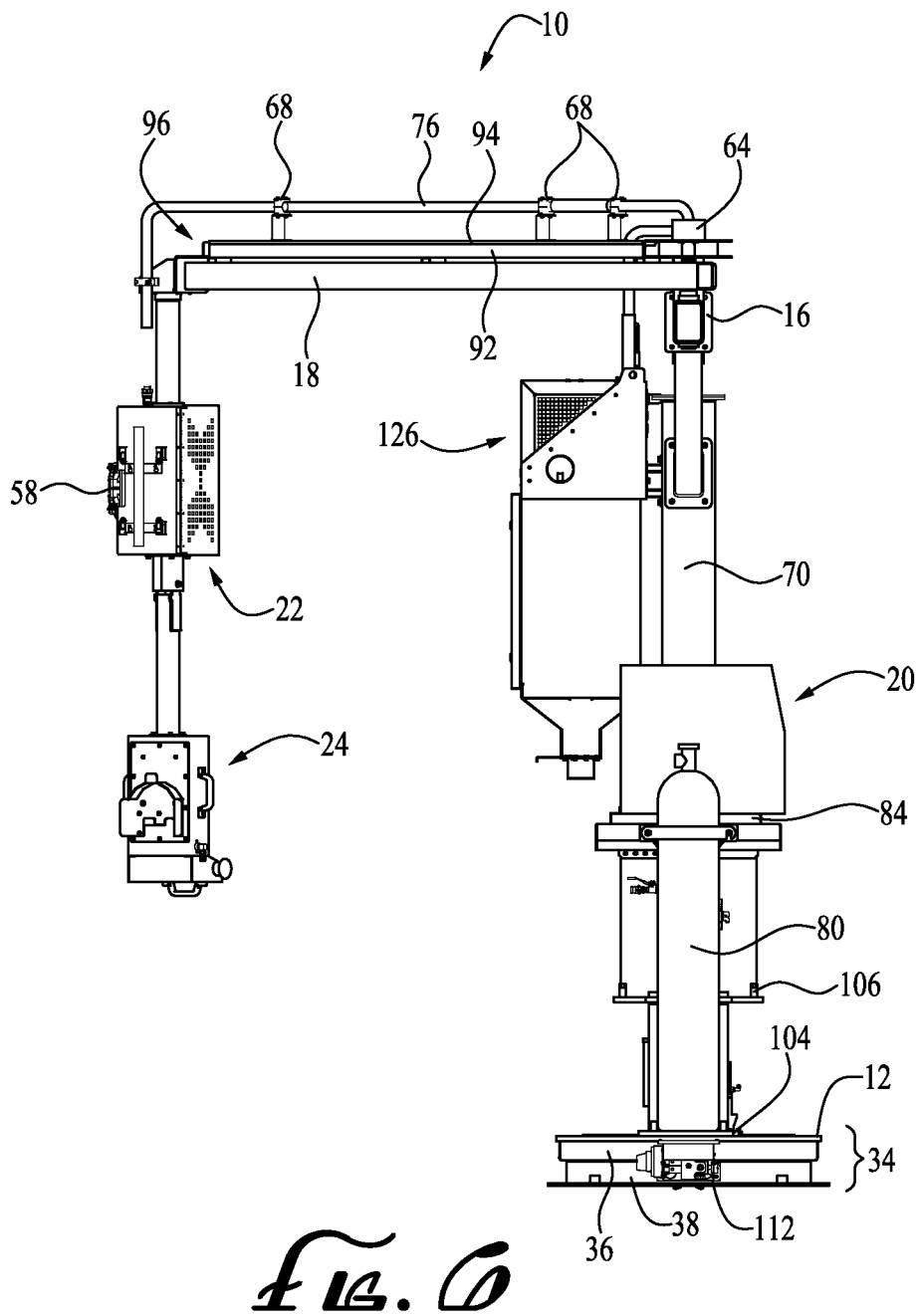
FIG. 6 is an end view of the welding apparatus illustrated in FIG. 4.

The following discussion describes in detail one embodiment of the invention and several variations of that embodiment. This discussion should not be construed, however, as limiting the invention to those particular embodiments. Practitioners skilled in the art will recognize numerous other embodiments as well.

Definitions

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers, ingredients or steps.

The Invention

The invention is a rotatable gas metal arc welding apparatus 10 comprising: a) a base 12; b) a rotation brake 14; c) a primary welding boom arm 16; d) at least one secondary welding boom arm 18; e) a MIG welder station 20; f) at least one manually operated welding gun connector 22; g) a process controller 24; h) a rotatable electrical input connection 26; i) an electrical ground connection 28; and j) a welding wire supply station 30. FIGS. 1-8 and 12-17 illustrate one embodiment of the invention.

The base 12 is rotatable. Such rotation is preferably at least 360 degrees, and is typically more than 360 degrees (i.e., no rotation limit in either direction).

Figure 18:
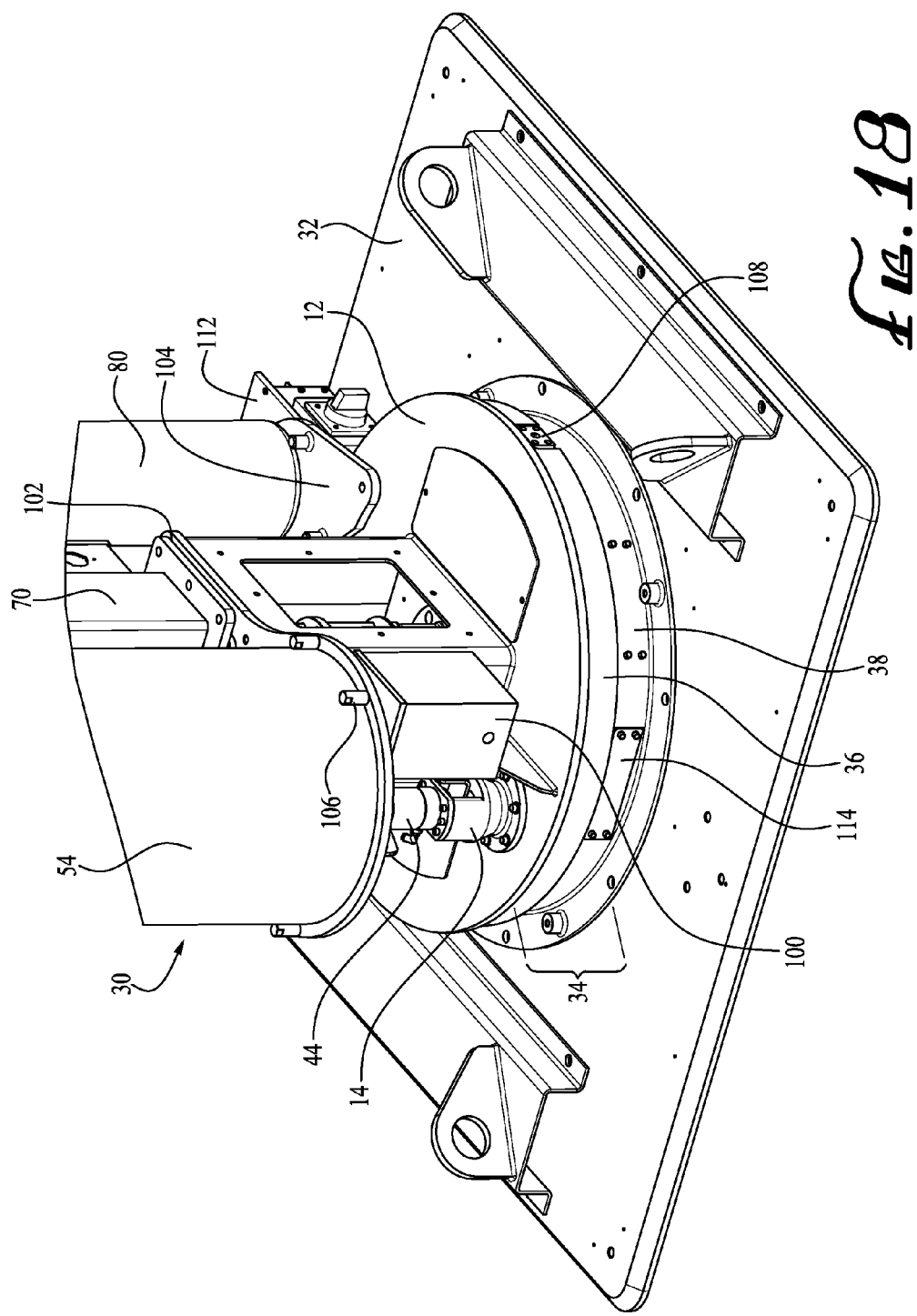
FIG. 18 is a reverse perspective view of a base portion having features of the present invention and showing the base mounted to a pallet plate.
Figure 19:
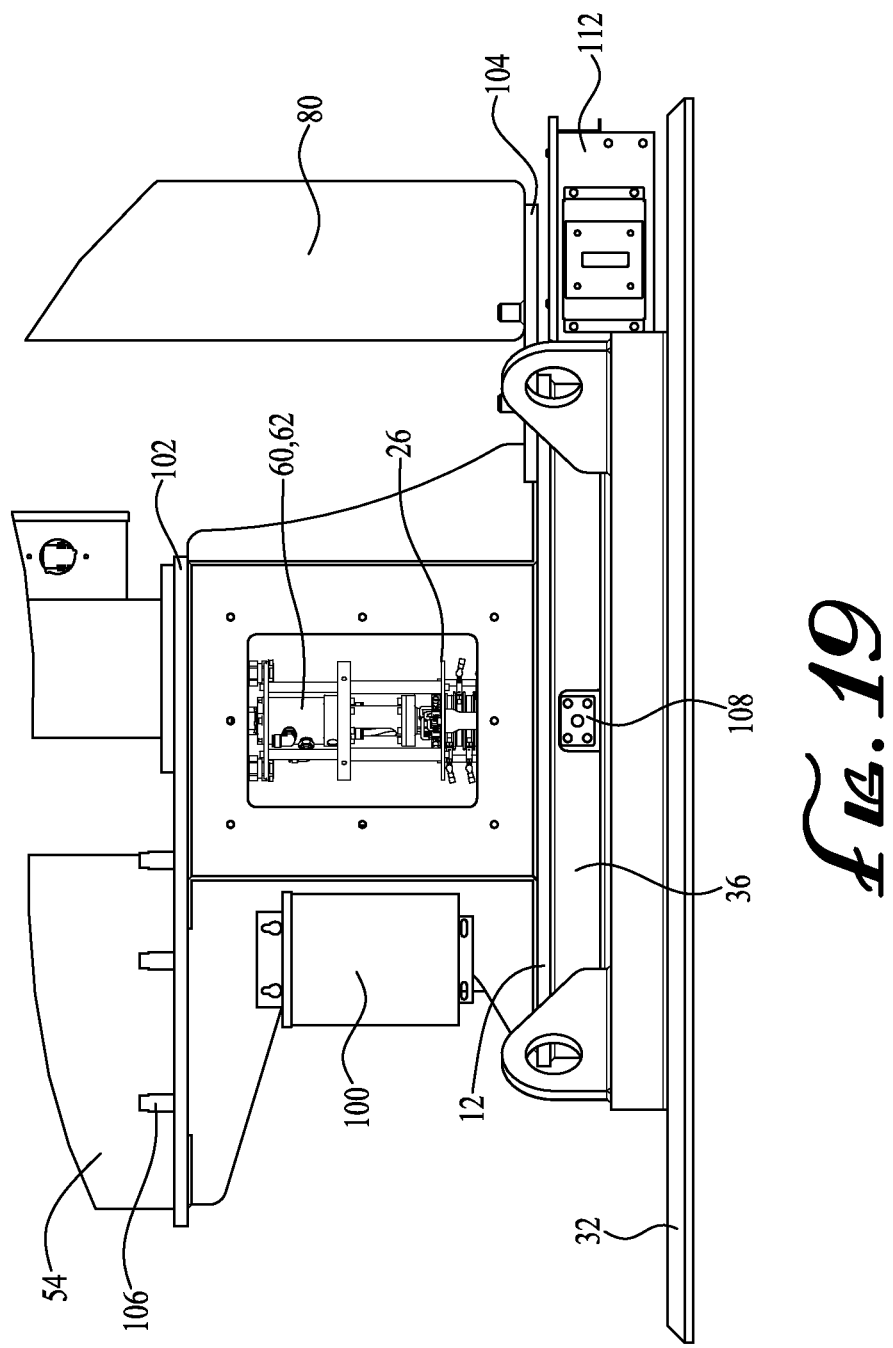
FIG. 19 is a side view of the base portion illustrated in FIG. 18.

The base 12 can be permanently disposed at a single floor location or, it can be disposed on a movable pallet plate 32, as shown in FIGS. 18 and 19. In either case, the base 12 is mounted on a bearing 34 which enables the base 12 to rotate. The bearing 34 is large enough (for example, 36") to allow all cables and hoses to pass through its center and to also provide a large enough base 12 to ensure boom stability.

In the embodiment illustrated in the drawings, the base 12 includes an upper (outer) bearing race 36 and a lower (inner) bearing race 38. The upper bearing race 36 is preferably machined directly into the base 12 weldment so as to ensure concentricity and smooth rotation. The lower bearing race 38 is constructed so as to provide a base 12 mounting flange with which to mount the boom to a concrete floor or to a pallet plate 32, and which is strong enough to support the entire welding apparatus 10 in normal use. The bearing 34 preferably has a matching ball bearing raceway 40 machined into the base 12 weldment. This provides a unitized and concentric bearing race and smooth boom rotation. It also allows for the incorporation of a rotatable electrical input connection 26, specifically in this view a slip-ring, for mounting into the housing. Concentricity of both upper and lower bearing races 36, 38 with the rotatable electrical input connection 26 is critical to proper operation of the boom. Therefore, there is a need to machine them precisely and concentrically.

The rotation brake 14 alternatively (i) allows the rotation of the base 12 and (ii) halts the rotation of the base 12. The rotation brake 14 eliminates drift and allows the primary welding boom arm 16 to remain stationary while the secondary welding boom arm 18 rotates into position. In the embodiment illustrated in the drawings, the rotation brake 14 minimizes the brake clamping force required due to its radial location.

The rotation brake 14 is typically mounted to the base 12 and is pneumatically driven. The rotation brake 14 provides simple and fool proof operation, high productivity and extremely quick operation of the boom. The pneumatic drive provides powerful clamping, rapid operation and remote operation.

In the embodiment illustrated in the drawings, the rotation brake 14 also provides the electrical ground connection 28. Such design assures that the electrical ground connection 28 is not hindered by welding boom rotation.

In operation of the embodiment illustrated in the drawings, when an operator desires to move the welding operation to a new location within the boom arm coverage area, the operator flips a brake control toggle switch 42 located on the process controller 24. The brake control toggle switch 42 actuates an air cylinder 44 that raises the rotation brake mechanism 14—thereby allowing boom rotation—and disengaging a grounding plate 28—thereby disconnecting the electrical ground connection 28—all in one movement. The operator then rotates the primary welding boom arm 16 to the new location and reverses the brake control toggle switch 42 to reverse the air cylinder 44—thereby locking the primary welding boom arm 16 to prevent its rotation and reestablishing the electrical grounding connection 28.

As illustrated in the drawings, the primary welding boom arm 16 is attached to the base 12 and the secondary welding boom arm 18 is rotationally connected to the primary welding boom arm 16 by a swivel joint 46 which allows rotation of the secondary welding boom arm 18 with respect to the primary welding boom arm 16 in a generally horizontal plane. Such welding boom design allows for total area coverage of the arc swing with no "dead areas" where welding cannot be performed due to lack of reach. The secondary welding boom arm 18 is of sufficient length to allow welding or other working equipment disposed at the distal end of the secondary welding boom arm 18 to access a work piece which is positioned in close proximity to the base 12.

The swivel joint 46 between the primary welding boom arm 16 and a secondary welding boom arm 18 provides sufficient joint strength to support the secondary welding boom arm 18 loads during normal operation. The swivel joint 46 allows operating cables and hoses to pass loosely through the swivel joint 46 throughout full rotation without binding or kinking.

In the embodiment illustrated in FIG. 8, the swivel joint 46 comprises a pivot bearing 48 having a bearing sleeve 50 and a pivot pin 52.

FIGS. 9-11 illustrate an alternative embodiment wherein the welding apparatus comprises a first secondary welding boom arm 18a and a second secondary welding boom arm 18b. In this embodiment, each secondary welding boom arm 18 is rotatable about the vacuum swivel joint 46 so as to be rotatable in a generally horizontal plane. The first secondary welding boom arm 18a and the second secondary welding boom arm 18b are designed so that the rotation of each secondary welding boom arm 18 is not hindered by the other secondary welding boom arm 18.

The MIG welder station 20 is attached to the apparatus. In the embodiments illustrated in the drawings, the at least one manually operated welding gun connector 22 is suspended from a secondary welding boom arm 18. In the embodiment illustrated in the drawings, the welding gun connector 22 is below a wire feeder 58. Additionally, a manually operated welding gun 128 is connected to each welding gun connector 22.

Each process controller 24 is attached to the apparatus. Each process controller 24 controls the welding gun 128 and the rotation brake 14. Each process controller 24 is disposed near the end of the boom for the convenience of the operator. In the embodiment illustrated in the drawings, each process controller 24 is suspended from a secondary welding boom arm 18, below a welding gun connector 22.

Figure 12:
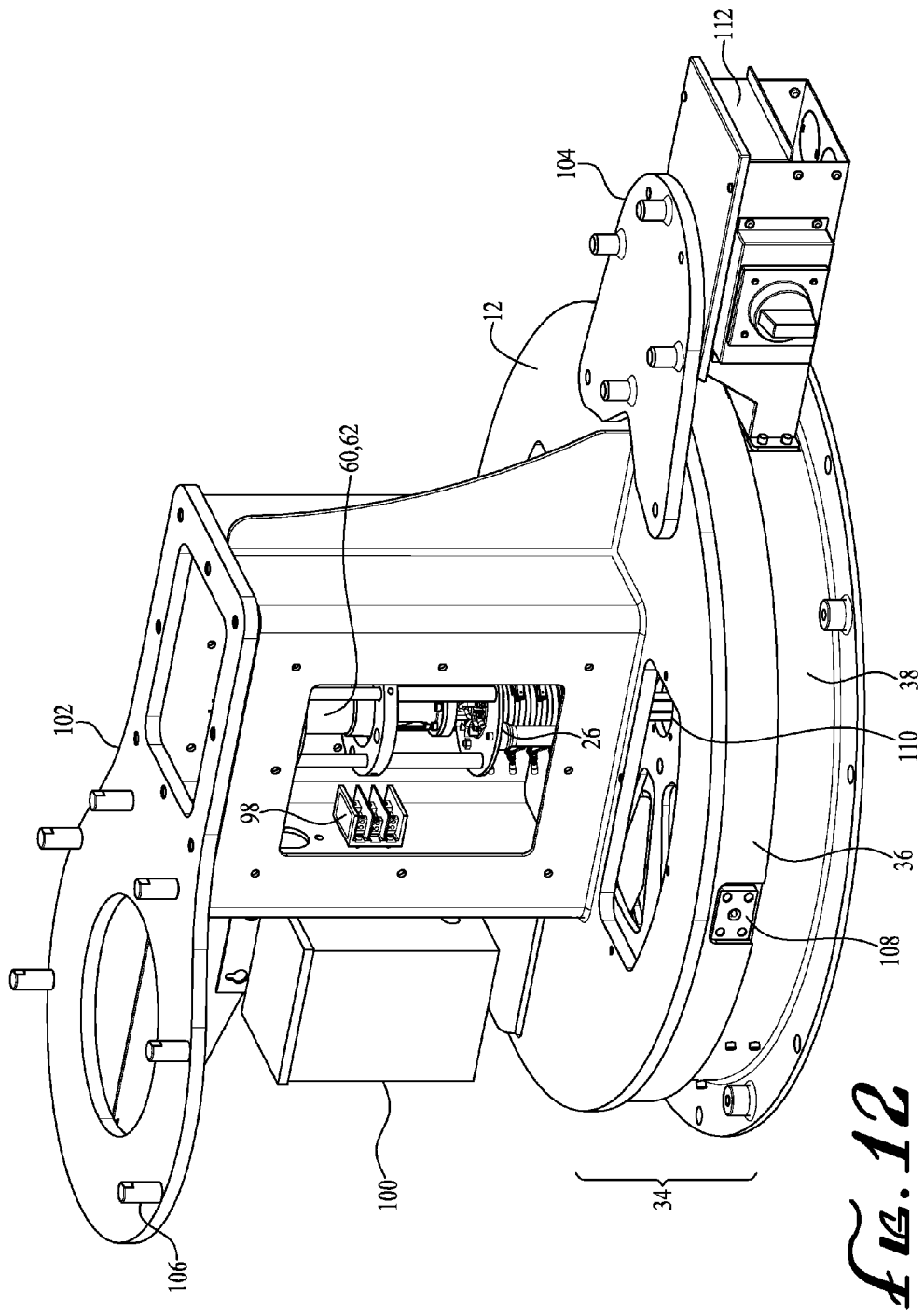
FIG. 12 is a detailed perspective view of the base portion of the welding apparatus illustrated in FIG. 1.
Figure 13:
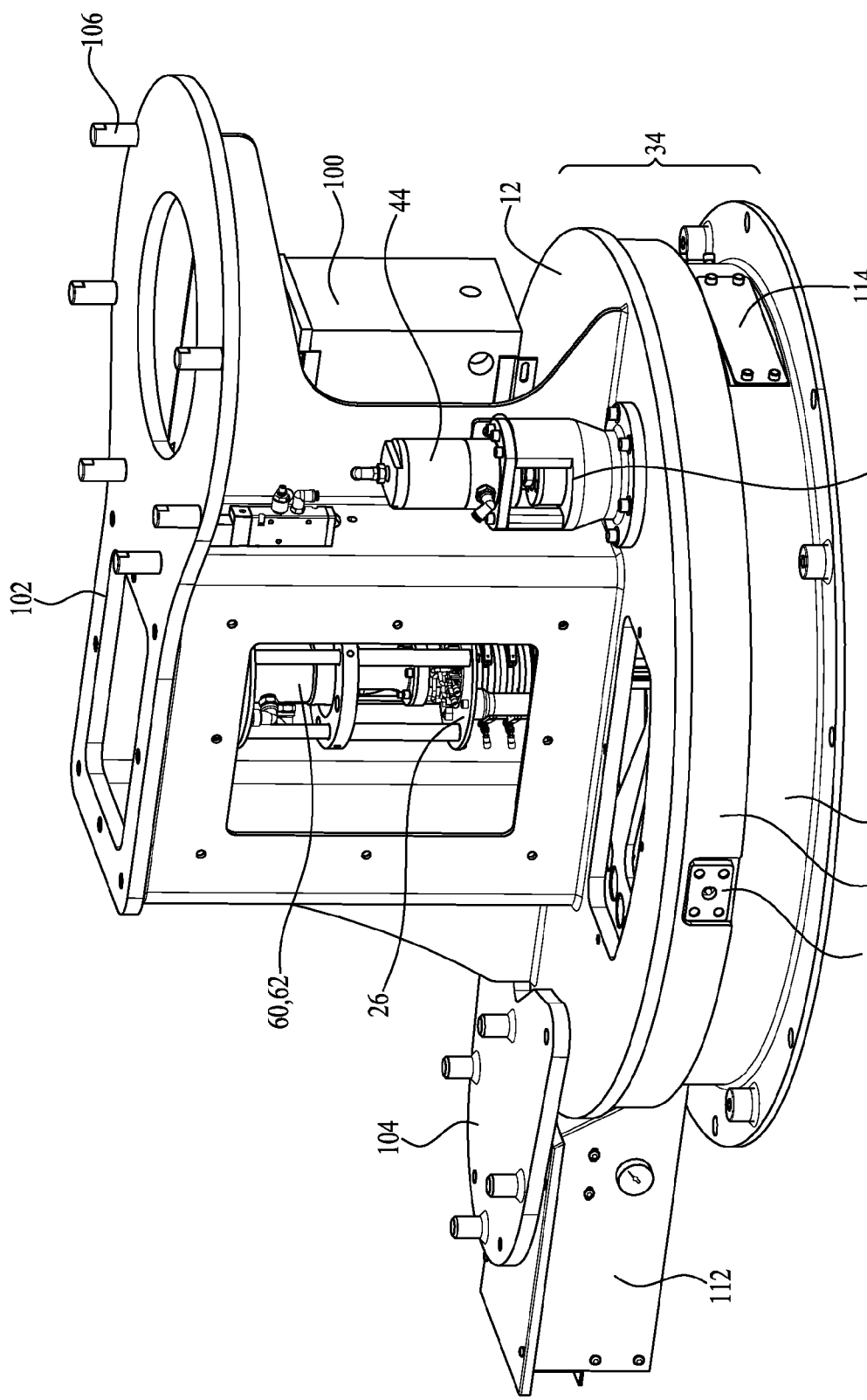
FIG. 13 is a reverse side perspective view of the base portion illustrated in FIG. 12.
Figure 14:
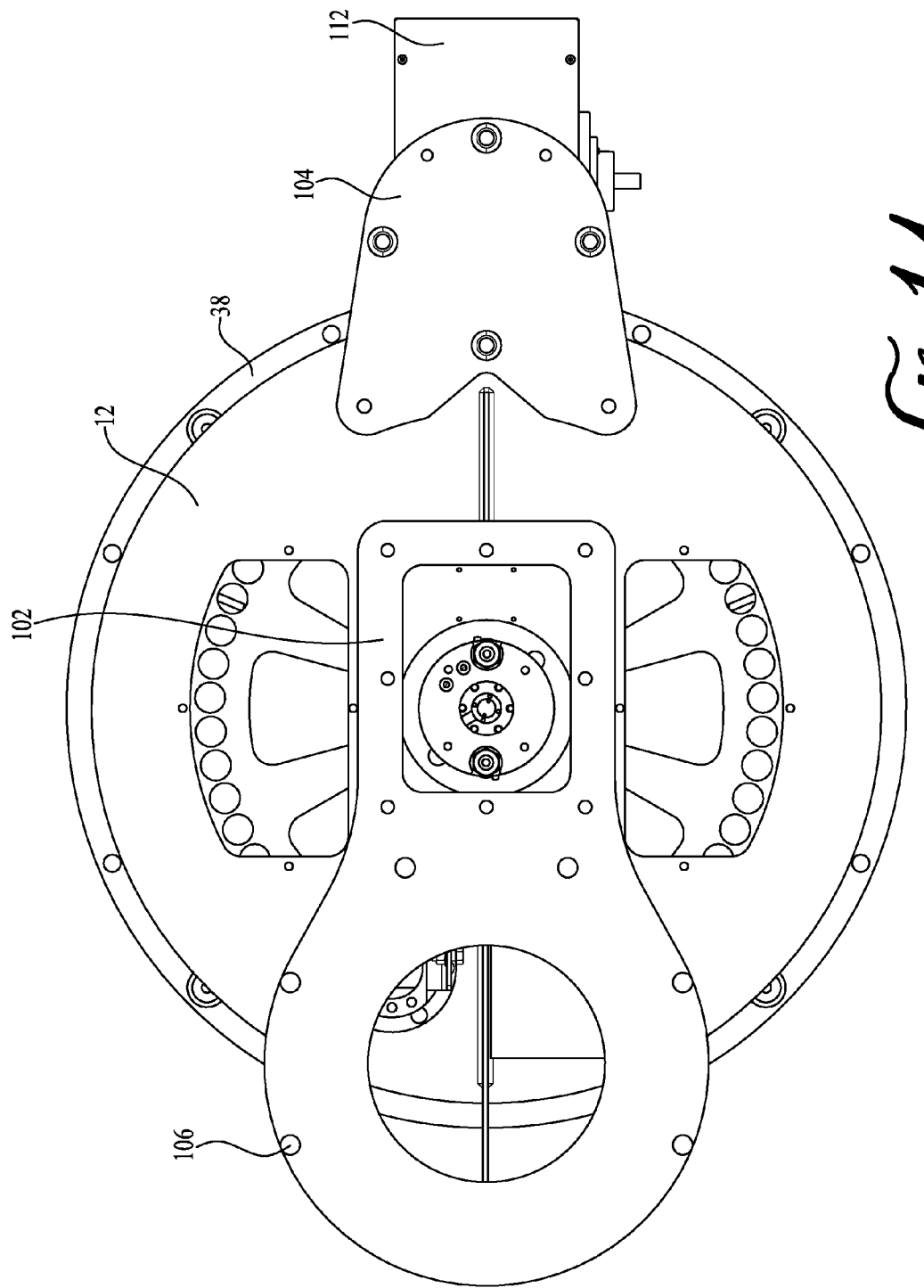
FIG. 14 is top view of the base portion illustrated in FIG. 12.

The rotatable electrical input connection 26 connects electrical power from an external electrical power source to the base 12. As illustrated in FIGS. 12-13, the rotatable electrical input connection 26 is provided by a slip ring.

The electrical ground connection 28 is configured so as to be unhindered by the rotation of the base 12. As noted above, and as shown in FIG. 17, the electrical ground connection 28 can be incorporated into the rotation brake 14. When the electrical ground connection 28 is provided by the rotation brake 14, the electrical ground connection 28 is disposed near the floor close to external ground cables and conduits.

The welding wire supply station 30 is attached to the apparatus. In the embodiment illustrated in the drawings, a bulk drum 54 is attached to the welding wire supply station 30 on the base 12 for retaining welding wire. The bulk drum 54 has a typical capacity of 250 lbs. to 1,000 lbs. and a spool having a typical capacity of 30 lbs. to 60 lbs. The invention preferably also comprises an enclosed wire supply conduit running 56 from the spool or bulk drum 54 to a wire feeder 58.

Figure 15:
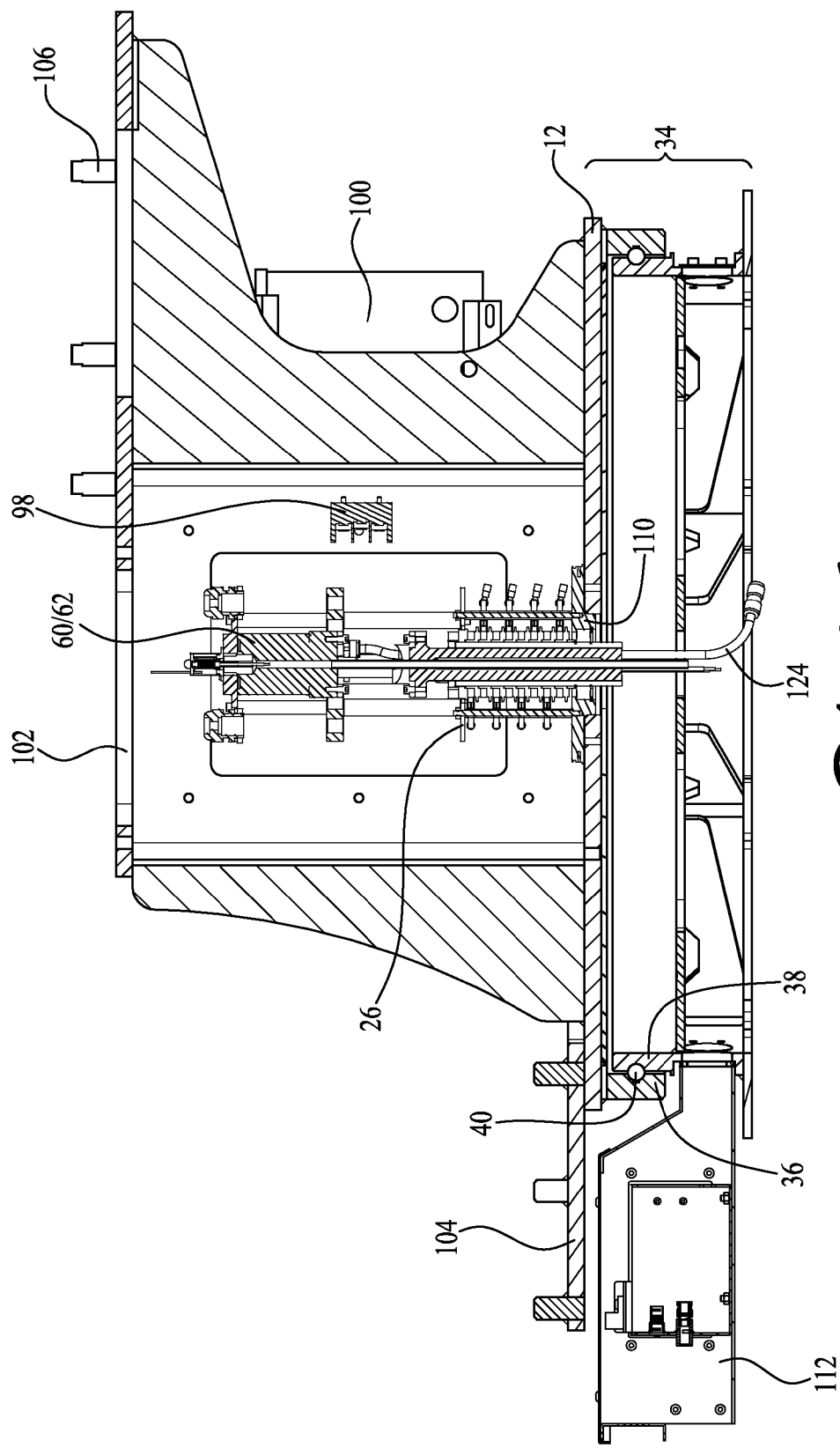
FIG. 15 is a cut away view of the base portion illustrated in FIG. 14 taken along the center line of rotation.
Figure 16:
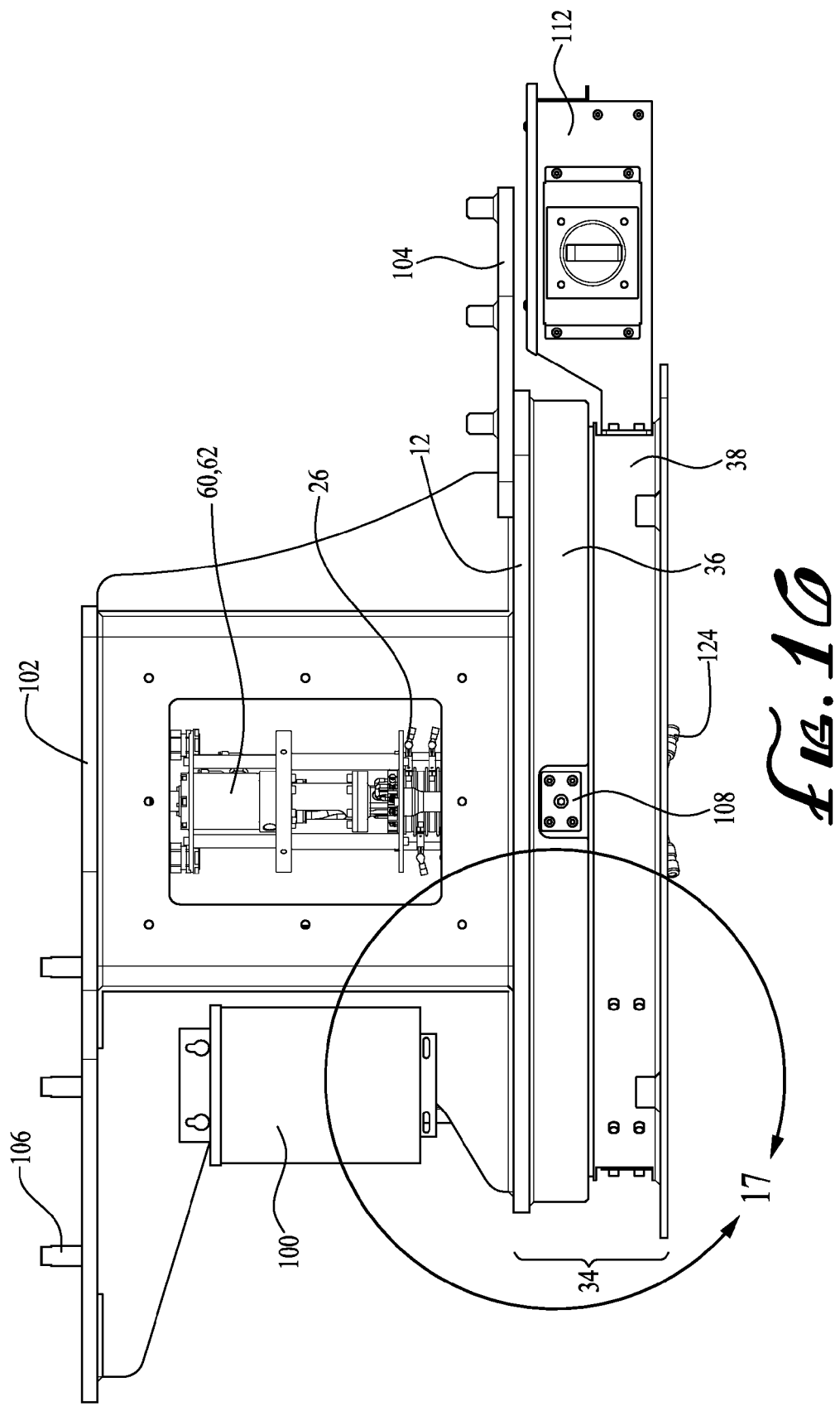
FIG. 16 is a reverse side view of the base portion illustrated in FIG. 15 and showing details of component parts.
Figure 17:
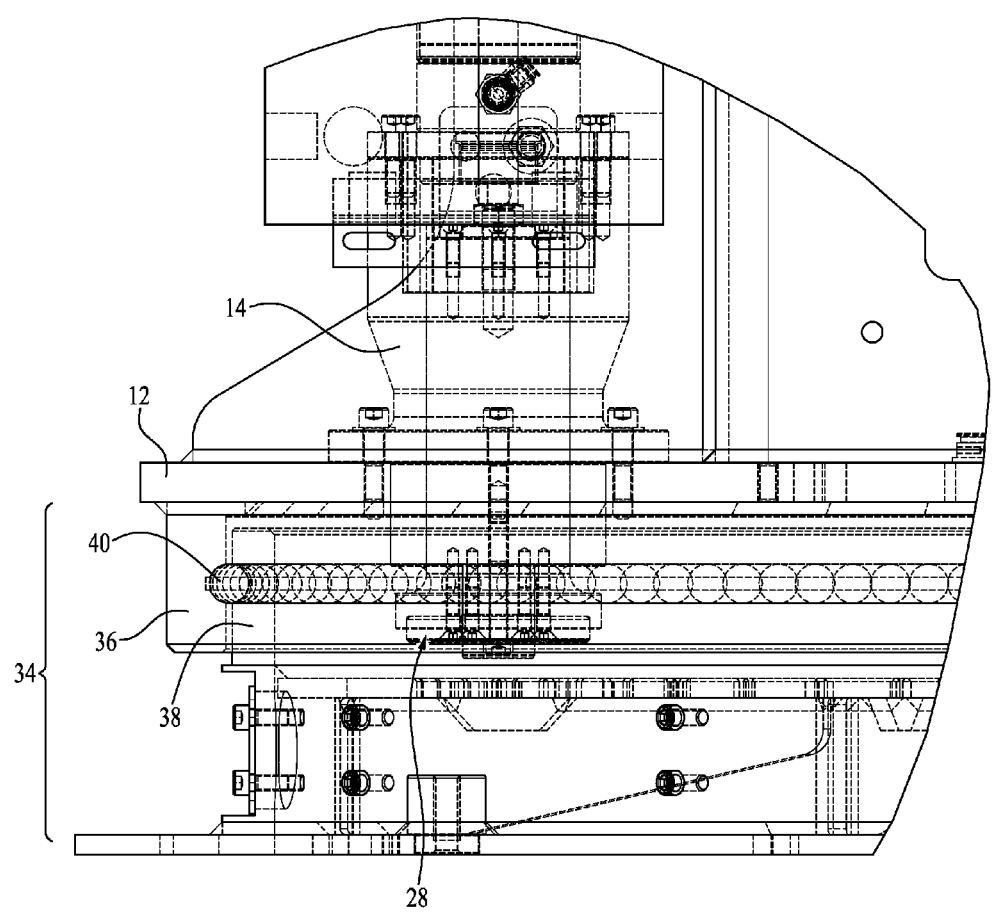
FIG. 17 is a detailed view of components within the base portion illustrated in FIG. 16.

Preferably, as shown in FIG. 15, the welding apparatus 10 further comprises a pneumatic power rotary union 60 for connecting pneumatic power to the base 12 and an inert gas rotary union 62 for connecting inert gas to the base 12. The pneumatic power rotary union 60 and the inert gas rotary union 62 can be provided by a single rotary union.

As seen in FIG. 1, the welding apparatus can further comprise a vacuum swivel joint 64, a tube clamp 66, a bracket 68, a column post 70, a barrel clamp mount 72, a vacuum tube 74 on the primary arm, a vacuum tube 76 on the secondary arm, a friction washer 78, an inert gas bottle 80, a swivel cap 82, and a pulsed MIG mounting bracket 84. The enclosed wire supply conduit 56 can comprise a primary arm raceway channel 86, a chaseway cover 88 on the primary arm 16, a cable spool pivot 90, a secondary arm raceway channel 92, a chaseway cover 94 on the secondary arm 18 and a cable entry funnel 96.

As seen in FIGS. 12 and 13, the welding apparatus can further comprise a power distribution block 98, a transformer 100, a column base pedestal 102, an inert gas bottle support plate 104, a track drum alignment pin 106, a bearing cap 108, a slip ring connector inlet tube 110, a cable entry box 112 and a lower bearing cable entry block-off plate 114.

Also in the embodiment illustrated in the drawings, the invention further comprises a cable spool 116. The cable spool has a cable support plate 118, two large diameter support posts 120 and top containment plate 122. The cable support plate 118 is attached only to the primary welding boom arm 16 and forms the base of the cable and hose spool assembly. The two large diameter support posts 120 are arranged to permit passage of cables and hoses in between. The support posts 120 are large enough to control the bend radius of cables and hoses as the secondary welding boom arm 18 rotates about its arc travel. The top containment plate 122 is centered over the bottom cable support plate 118 and is spaced sufficiently to allow passage of cables and hoses.

The welding apparatus 10 is insulated to protect from unintentional grounding in the event that any part of the boom comes into contact with the work piece. Such insulation isolates the electrical grounding path from the boom structure and provides a defined electrical grounding path.

The invention can also comprise a bulk remote inert gas pipeline 124.

Preferably, the invention incorporates fume extraction equipment 126. The fume extraction equipment 126 can further comprise a vacuum tube 74 on the primary welding boom arm 16 and a vacuum tube 76 on the secondary welding boom arm 18, which is located proximate to the weld gun and is capable of providing fume extraction over the entire boom coverage area. The fume extraction equipment 126 is self-contained and movable with the operator. The fume extraction equipment 126 is attached to the welding apparatus 10, thus eliminating the need to "drag" the fume extractor 126 into position each time the welder moves to a new location.

As noted above, it is preferable that all welding apparatus components be mounted on the welding apparatus 10. This allows un-tethered, unrestricted, rotation of the welding boom to 360 degrees and beyond. Also, it is preferable that all process controls be located near the end of the at least one secondary boom 18, so as to be conveniently close to the operator. This places all necessary items at fingertip reach.

The invention provides a productivity focused tool long needed for the welding industry. As noted above, the double articulating boom allows for total area coverage of the arc swing with no "dead areas" where welding cannot be performed due to lack of reach. Most prior art welding booms are only single articulated and can only cover a "donut" shaped area—leaving the center of the "donut" in-accessible, The "total coverage" provided by the welding boom of the invention is unique in the art.

What is claimed is:

1. A rotatable gas metal arc welding system comprising:
   a) a rotatable base capable of unlimited rotation in either direction;
   b) a rotation brake coupled to the rotatable base for alternatively (i) allowing rotation of the rotatable base and (ii) halting the rotation of the rotatable base;
   c) a column post attached to the rotatable base for unlimited rotation in either direction with the rotatable base;
   d) a primary welding boom arm attached to the column post for unlimited rotation in either direction with the base;
   e) a first secondary welding boom arm rotatably attached to the primary welding boom arm, the first secondary welding boom arm being rotatable about a swivel joint so as to be rotatable in a generally horizontal plane;
   f) a MIG welder station mounted on the column post above the rotatable base for unlimited rotation in either direction with the rotatable base;
   g) a first manually operated welding gun connector, the first welding gun connector being suspended from the first secondary welding boom arm;
   h) a process controller suspended from the first secondary welding boom arm, for controlling a welding gun and the rotation brake;
   i) a rotatable electrical input connection comprising a rotary slip ring coupled to the rotatable base for connecting electrical power from an external electrical power source to the rotatable base;
   j) an electrical ground connection coupled to the rotatable base, the ground connection being unhindered by the unlimited rotation in either direction of the rotatable base;
   k) a welding wire supply station mounted on the column post above the rotatable base for unlimited rotation in either direction with the rotatable base; and
   l) a rotary union located in the rotatable base for connecting (i) pneumatic power to the rotatable base, or (ii) inert gas to the rotatable base or (iii) both pneumatic power and inert gas to the rotatable base.

2. The gas metal arc welding system of claim 1 wherein the rotatable base is rotatable in either direction by at least 360°.

3. The gas metal arc welding system of claim 1 wherein the rotatable base is mounted on a stationary floor mounted bearing.

4. The gas metal arc welding system of claim 1 wherein the rotatable base is mounted on a movable pallet plate.

5. The gas metal arc welding system of claim 1 further comprising a manually operated welding gun connected to the welding gun connector.

6. The gas metal arc welding system of claim 5 wherein the manually operated welding gun is a MIG welder.

7. The gas metal arc welding system of claim 1 wherein the process controller is suspended from the first secondary welding boom arm.

8. The gas metal arc welding system of claim 1 wherein the rotation brake is configured to provide the electrical ground connector.

9. The gas metal arc welding system of claim 1 comprising a second secondary welding boom arm, each secondary welding boom arm being rotatable about a swivel joint so as to be rotatable in a generally horizontal plane.

10. The gas metal arc welding system of claim 9 wherein each secondary welding boom arm is rotatable about the swivel joint without being hindered by another secondary welding boom arm.

11. The gas metal arc welding system of claim 1 further comprising a drum attached to the rotatable base for retaining welding wire.

12. The inert gas metal arc welding system of claim 1 further comprising an inert gas bottle station mounted on the rotatable base for unlimited rotation in either direction with the rotatable base.

13. The gas metal arc welding system of claim 1 further comprising a weld fume extractor coupled to the column post for unlimited rotation in either direction with the rotatable base.

14. A gas metal arc welding system comprising:
a) a base rotatable in either direction without limit;
b) a rotation brake coupled to the rotatable base for alternatively (i) allowing rotation of the rotatable base and (ii) halting the rotation of the rotatable base;
c) a column post attached to the rotatable base for rotation in either direction without limit with the rotatable base;
d) a primary welding boom arm attached to the column post for rotation in either direction without limit with the rotatable base;
e) at least one secondary welding boom arm rotatably attached to the primary welding boom arm, the at least one secondary welding boom arm being rotatable about a swivel joint so as to be rotatable in a generally horizontal plane;
f) at least one manually operated welding gun, each welding gun being suspended from a secondary welding boom arm;
g) a process controller suspended from a secondary welding boom arm for controlling a welding gun and the rotation brake;
h) a rotary slip ring located in the rotatable base for connecting electrical power from an external electrical power source to the rotatable base;
i) an electrical ground connection coupled to the rotatable base, the ground connection being unhindered by the rotation of the rotatable base;
j) a bulk drum base for retaining welding wire mounted on the column post above the rotatable base for rotation in either direction without limit with the rotatable base;
k) a rotary pneumatic power union coupled to fbthe rotatable base for connecting pneumatic power to the rotatable base or for connecting inert gas to the rotatable base or for connecting both pneumatic power and inert gas to the rotatable base; and
l) a weld fume extractor coupled to the column post.

15. The gas metal arc welding system of claim 14 wherein the rotatable base is mounted on a stationary floor mounted bearing.

16. The gas metal arc welding system of claim 14 wherein the rotatable base is mounted or on a movable pallet plate.

17. The gas metal arc welding system of claim 14 wherein the at least one secondary welding boom arm comprises a first secondary welding boom arm and a second secondary welding boom arm, each secondary welding boom arm being rotatable about a swivel joint so as to be rotatable in a generally horizontal plane, wherein each secondary welding boom arm is rotatable about the swivel joint without being hindered by another secondary welding boom arm.

18. The gas metal arc welding system of claim 9 comprising a second manually operated welding gun connector suspended from the second secondary welding boom.

19. The gas metal arc welding system of claim 17 wherein the process controller can control multiple welding guns.

20. The gas metal arc welding system of claim 9 further comprising a manually operated welding gun connected to each of the welding gun connectors.

21. A method of rotating a rotatable gas metal arc welding system comprising the steps of:
a) providing the rotatable gas metal arc welding system of claim 1;
b) rotating the primary welding boom arm more than 360 degrees.

* * * * *